UNITED STATES PATENT OFFICE.

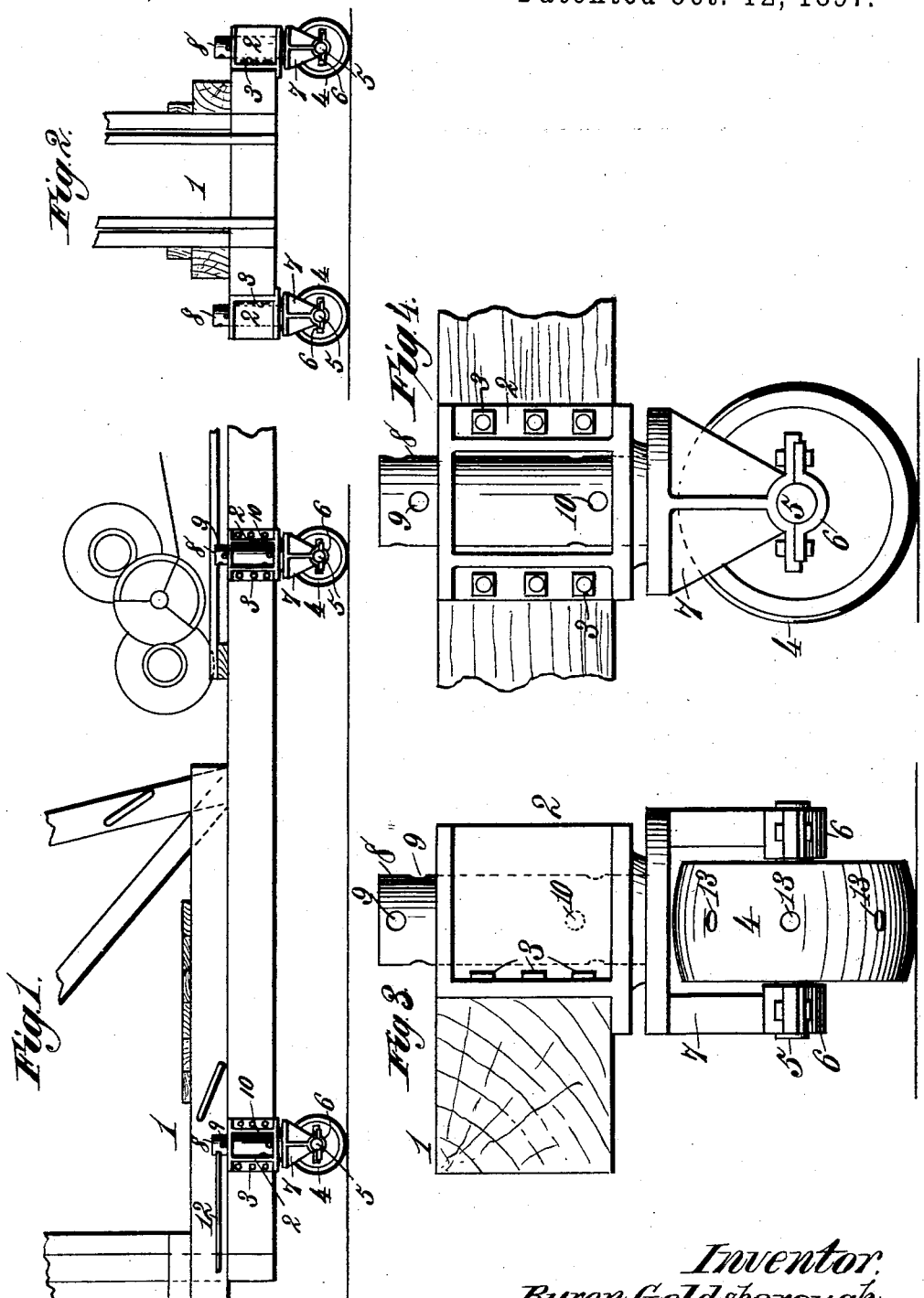

BYRON GOLDSBOROUGH, OF NEW YORK, N. Y.

SUPPORTING-WHEEL FOR PILE-DRIVERS, &c.

SPECIFICATION forming part of Letters Patent No. 591,756, dated October 12, 1897.

Application filed June 26, 1897. Serial No. 642,435. (No model.)

*To all whom it may concern:*

Be it known that I, BYRON GOLDSBOROUGH, a citizen of the United States, residing at New York city, in the county of New York and State of New York, have invented new and useful Improvements in Supporting-Wheels for Pile-Drivers and other Purposes, of which the following is a specification.

In pile-drivers, traveling derricks, and other heavily-loaded carriages or travelers used in engineering work it is desirable to provide simple and convenient means whereby they may be moved laterally as well as back and forth—that is to say, in right-angular planes or approximately so. This result is accomplished by me in the manner and by the means hereinafter described and claimed, reference being made to the accompanying drawings, in which—

Figure 1 is a side elevation of the lower portion of a pile-driver mounted on wheels constructed according to my invention. Fig. 2 is a detail front elevation showing the wheels set at right angles to the position they occupy in Fig. 1 for moving the pile-driver laterally, and Figs. 3 and 4 are detail views of one of the swiveled supporting-wheels.

In order to enable those skilled in the art to make and use my invention, I will now describe the same in detail, referring to the drawings, wherein—

The numeral 1 indicates the carriage or platform of a pile-driver which, as usual, is more or less heavily loaded. The sides of the carriage or platform are provided with spindle bearings or boxes 2, rigidly attached thereto by bolts 3 or otherwise. The rotary supporting-wheels 4 are constructed with very broad treads and are mounted on axles 5, arranged in suitable bearings 6 on a wheel-frame 7. These wheel-frames are constructed with perpendicular spindles 8, which are swiveled in the spindle bearings or boxes 2 in such manner that the spindles can axially turn in the bearings or boxes. Inasmuch as a pile-driver or heavily-loaded carriage or platform mounted on wheels in the manner described creates excessive pressure on the spindles they cannot ordinarily be turned whenever it is desired to change the direction of movement of the pile-driver, carriage, or traveler—as, for instance, to move the same laterally or in a plane at right angles, or approximately so, to its back-and-forth or other movement. Therefore I construct the spindles 8 so that they may be engaged with means by which the spindles can be mechanically turned to set the supporting-wheels in the required position for the movement of the pile-driver or carriage either back and forth or laterally. As here shown, the spindles 8 are constructed with a series of transverse orifices 9 at their upper ends and a series of transverse orifices 10 at their lower ends for the purpose of receiving rods, as at 12, of greater or less length, which constitute levers by which the spindles may be turned in either direction to set the supporting-wheels 4 in the position required to move the pile-driver or carriage in the direction desired. The transverse orifices in the lower end portions of the spindles are rendered accessible by constructing the spindle bearings or boxes with open sides, so that the lever-rods can be inserted and engaged with the orifices in the spindles, as will be obvious. The rims or treads of the supporting-wheels are also constructed with orifices 13 for the reception of lever-rods by which to turn these wheels and thus move the pile-driver or carriage.

The orifices in the spindles are located at different points around the same to facilitate the engagement of the lever-rods therewith and to enable the spindles to be turned the required distance by placing the lever-rods successively in the orifices.

The lower portions of the spindle bearings or boxes rest upon the horizontal portions of the wheel-frames, and, if desired, ball-bearings may be placed between the wheel-frames and the spindle bearings or boxes to reduce friction. As this, however, is an obvious expedient, I do not consider it essential to illustrate the same.

My invention is particularly designed for use in connection with a pile-driver to facilitate moving the same laterally and back and forth; but I wish it understood that the invention is useful in connection with any more or less heavily-loaded carriage or platform which requires to be moved in different directions.

The lever-rods should be of considerable length in order to secure the necessary leverage to turn the spindles under the weight of the pile-driver or loaded carriage.

Having thus described my invention, what I claim is—

1. A pile-driver having its carriage or platform provided with a set of supporting-wheels having wheel-frames and spindles constructed with orifices to receive lever-rods by which the spindles may be turned to set the supporting-wheels in the position required to move the pile-driver either back and forth, or laterally, substantially as described.

2. The combination with a movable carriage, of spindle bearings or boxes having open sides and rigidly secured to said carriage, and a set of supporting-wheels having wheel-frames provided with spindles mounted in said bearings or boxes, and constructed with a plurality of transverse orifices to receive lever-rods, whereby the spindles may be turned to set the supporting-wheels in the position required to move the carriage either back and forth, or laterally, substantially as described.

In testimony whereof I have hereunto set my hand in presence of two subscribing witnesses.

BYRON GOLDSBOROUGH.

Witnesses:
F. M. TALBOT,
NELLIE RAFERTY.